Nov. 1, 1927.
J. L. DAVIS
1,647,786
EGG TURNER FOR INCUBATORS
Filed Aug. 5, 1926    2 Sheets-Sheet 1
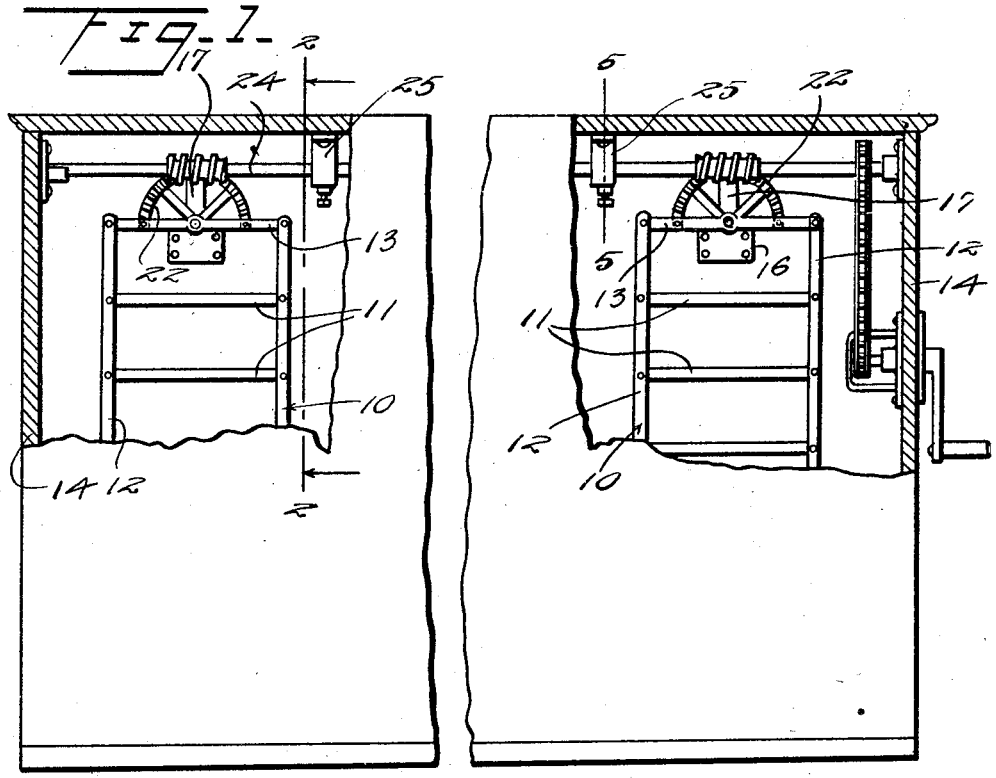
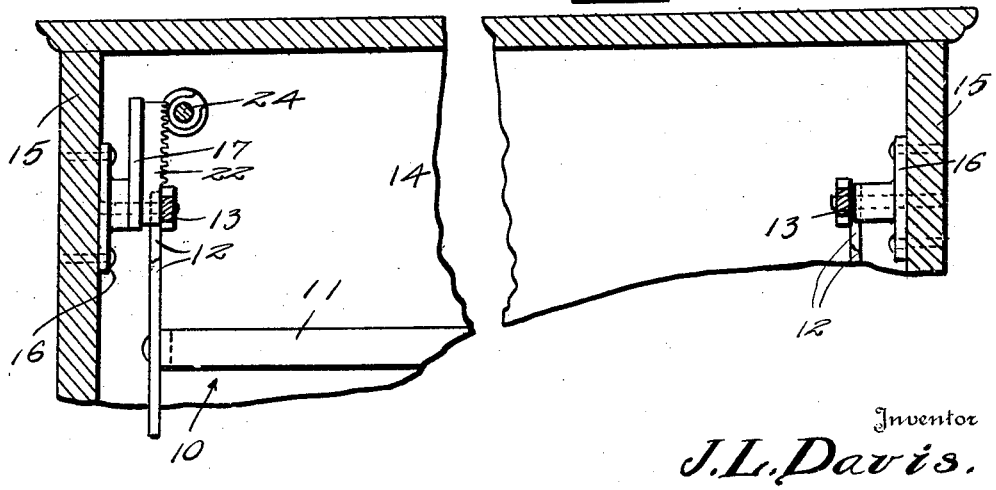
Inventor
J. L. Davis.
By Watson E. Coleman
Attorney

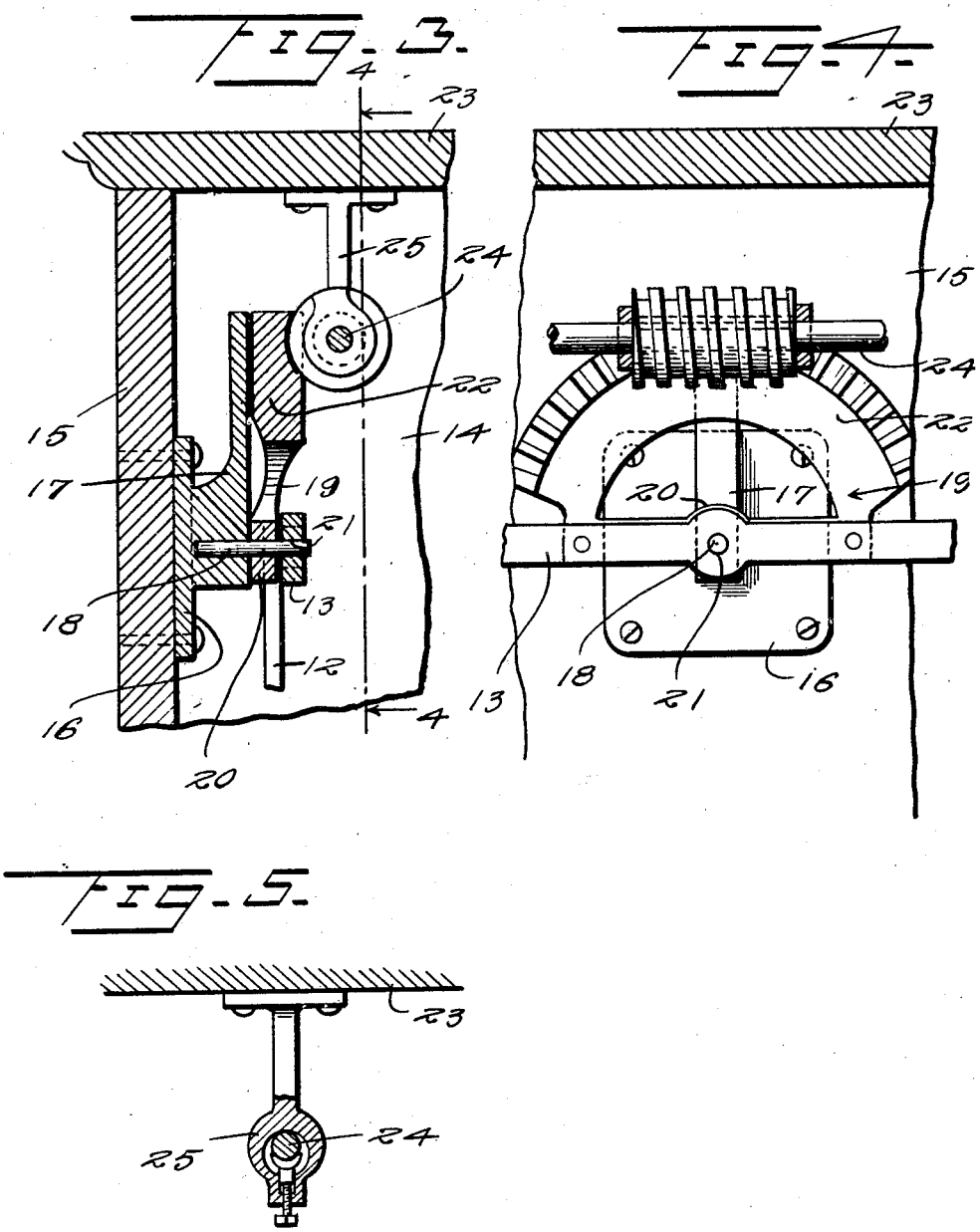

Patented Nov. 1, 1927.

1,647,786

UNITED STATES PATENT OFFICE.

JOSEPH L. DAVIS, OF ABINGDON, ILLINOIS.

EGG TURNER FOR INCUBATORS.

Application filed August 5, 1926. Serial No. 127,381.

This invention relates to egg turners for incubators and more particularly to an attachment for that type of incubator employing a plurality of superposed pivotally supported trays, the trays of each unit being connected together for simultaneous movement.

An important object of the invention is to improve the structure of my prior Patent No. 1,579,350, granted April 6, 1926, for egg turners for incubators, so that the structure will be free from portions which will interfere in any manner with the operation or inspection of the incubator.

A further and more specific object of the invention is to provide a device of this character which may be permanently left in position within the incubator, which is not positioned where it will interfere with the movement of persons within the incubator to inspect the egg tray and which will permit turning of the eggs only at such a speed as will prevent damage to the eggs as the tray is tilted from one side to the other of its pivotal center.

A still further object of the invention is to provide a device of this character which may be vary cheaply and readily constructed, which will be rugged in its construction and which may be readily operated.

These and other objects I attain by the construction shown in the accompanying drawings, wherein for the purpose of illustration is shown a preferred embodiment of my invention and wherein:—

Figure 1 is a side elevation partially in section of an incubator embodying egg turning apparatus constructed in accordance with my invention;

Figure 2 is a section on the line 2—2 of Figure 1;

Figure 3 is an enlarged sectional view taken through one of the operating members;

Figure 4 is a front elevation thereof;

Figure 5 is a section on the line 5—5 of Figure 1.

Referring now more particularly to the drawings, the type of incubator in which my invention is intended for use includes a plurality of egg tray units 10, each including a plurality of vertically superposed trays 11 pivotally connected at the corners thereof to vertically extending links 12. The upper ends of these links are connected to cross bars 13. By grasping any link or tray of the unit, the entire group of trays in the unit may be simultaneously tilted or inclined, thereby effecting a turning of the egg. The units 11 are arranged in rows extending longitudinally of the incubator and between opposed end walls 14.

In accordance with the present invention, I secure to the side wall 15 of the incubator brackets 16, the brackets of each end wall corresponding in number and position to the tray units 10. Each bracket has extending from its front face a lug 17 adjacent one end of which a pivot 18 is provided which is adapted to engage the cross bar 13 of the adjacent unit at the center thereof. To the cross bar 13, I secure a semi-circular worm segment 19 with the opening of its hub 20 in alignment with the opening 21 of the cross bar 13 through which the stub shaft 18 is to be directed. At the rear face of the gear, the rim 22 and hub 20 are arranged in the same plane and flatly abut the outer face of the lug when the cross bar 13 is in its proper position.

From the ceiling 23 of the incubator, a shaft 24 is supported by bearings 25, this shaft extending adjacent the perimeters of the segments 19 and having secured thereto a worm for each segment, which meshes with the segment to cause the same to rotate. This shaft may be driven in any suitable manner, being disclosed in the present instance as driven by a mechanism, such as illustrated in my prior patent.

It will be obvious that by rotating the shaft 24, the segments 19 will be slowly rotated about the stub shafts 18, carrying with them the cross bar 13, so that the angle of the trays of the units will be altered. It will furthermore be obvious that due to the worm drive employed, this rotation will be very slow and that accordingly the probability of any of the eggs within the tray becoming damaged during the turning operation is materially lessened.

Since the construction hereinbefore set forth is capable of a certain range of change and modification without materially departing from the spirit of the invention, I do not limit myself to such specific structure except as hereinafter claimed.

I claim :—

1. In combination with an incubator having a plurality of units of superposed pivotally supported trays therein, the trays of each unit being connected at the side edges by vertically extending bars the upper ends of which are connected by a cross bar, brackets secured to the walls of the incubator and having pivots for engagement with the cross bars at one end of the units, segment gears secured to the cross bars and coaxial with the pivots thereof, a shaft extending longitudinally of the incubator and adjacent each segment, a worm on the shaft for each segment and engaged therewith and means for rotating the shaft, said brackets each including a lug against which one side face of the segment engages, the teeth of the segment being formed in the opposite side face thereof.

2. In combination with an incubator having a plurality of units of superposed pivotally supported trays therein, the trays of each unit being connected at their side edges by vertically extending bars, a bracket secured to the wall of the incubator adjacent each unit, a segment pivoted upon the bracket and connected at opposite sides of the pivot with vertically extending bars at opposite sides of the associated unit, a shaft extending longitudinally of the incubator adjacent said segments and worms upon said shaft engaging the teeth of the segments.

3. In combination with an incubator having a plurality of units of superposed pivotally supported trays therein, the trays of each unit being connected at their side edges by vertically extending bars, a bracket secured to the wall of the incubator adjacent each unit, a segment pivoted upon the bracket and connected at opposite sides of the pivot with vertically extending bars at opposite sides of the associated unit, a shaft extending longitudinally of the incubator adjacent said segments and worms upon said shaft engaging the teeth of the segments, said brackets each including a lug against which one side face of the segment engages, the teeth of the segment being formed in the opposite side face thereof.

In testimony whereof I hereunto affix my signature.

JOSEPH L. DAVIS.